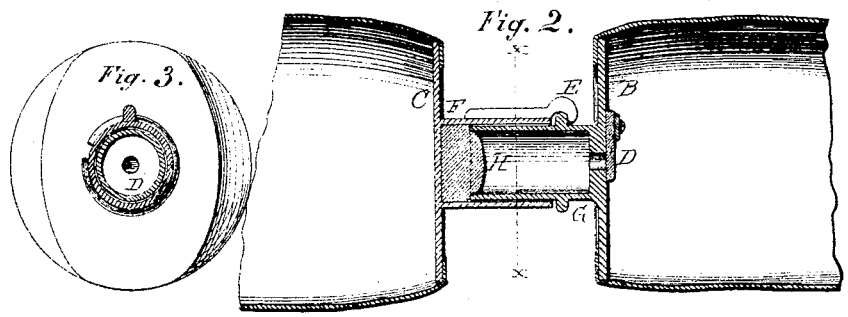
100,906.—LIFE-PRESERVER.—Camille Kci, Scranton, Pa.
*Claim.*—A life-preserver, having its ends provided with tubes F and G, the valve D, and bayonet-clasp, all constructed and arranged as herein described, so that it may be readily filled and clasped about the neck, as set forth.